(12) United States Patent
Myeong et al.

(10) Patent No.: US 12,080,071 B2
(45) Date of Patent: Sep. 3, 2024

(54) STRONG LASER SCANNER MATCHING METHOD AND APPARATUS CONSIDERING MOVEMENT OF GROUND ROBOT

(71) Applicant: KOREA ADVANCED INSTITUTE OF SCIENCE AND TECHNOLOGY, Daejeon (KR)

(72) Inventors: Hyeon Myeong, Daejeon (KR); Hyungjin Kim, Daejeon (KR); Seungwon Song, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 724 days.

(21) Appl. No.: 17/266,520

(22) PCT Filed: Nov. 15, 2019

(86) PCT No.: PCT/KR2019/015640
§ 371 (c)(1),
(2) Date: Feb. 5, 2021

(87) PCT Pub. No.: WO2020/101424
PCT Pub. Date: May 22, 2020

(65) Prior Publication Data
US 2021/0303908 A1    Sep. 30, 2021

(30) Foreign Application Priority Data

Nov. 16, 2018  (KR) .................. 10-2018-0141636
May 29, 2019   (KR) .................. 10-2019-0062980

(51) Int. Cl.
*G06V 20/56* (2022.01)
*G01S 17/89* (2020.01)

(52) U.S. Cl.
CPC .............. *G06V 20/56* (2022.01); *G01S 17/89* (2013.01)

(58) Field of Classification Search
None
See application file for complete search history.

(56) References Cited

U.S. PATENT DOCUMENTS

2017/0116781 A1* 4/2017 Babahajiani .......... G06T 15/506

FOREIGN PATENT DOCUMENTS

JP    2014186567 A    10/2014
JP    2014191796 A    10/2014
(Continued)

OTHER PUBLICATIONS

Yoneda et al. ("Urban road localization by using multiple layer map matching and line segment matching," 2015 IEEE Intelligent Vehicles Symposium (IV), Seoul, Korea (South), 2015, pp. 525-530) (Year: 2015).*

(Continued)

*Primary Examiner* — Roy Y Yi
(74) *Attorney, Agent, or Firm* — CHRISTENSEN O'CONNOR JOHNSON KINDNESS PLLC (57) ABSTRACT

Robust laser scanner matching method and device considering a movement of a ground robot are disclosed. A scan matching method according to an embodiment of the inventive concept includes receiving two point clouds, sequentially inspecting height values until a point is within a specific height range to search for correspondence points between the two point clouds, and performing scan matching between the two point clouds based on the search result of the correspondence points.

8 Claims, 9 Drawing Sheets

(56) References Cited

FOREIGN PATENT DOCUMENTS

| JP | 2015045558 A | 3/2015 |
|---|---|---|
| JP | 2016109650 A | 6/2016 |
| KR | 20180036753 A | 4/2018 |
| WO | 2017/199333 A1 | 11/2017 |
| WO | 2018/068653 A1 | 4/2018 |

OTHER PUBLICATIONS

Davide et al. "A Viewpoint Planning and Navigation Algorithm for Mobile Robots using Depth Images." Proceedings of the 2013 Australasian Conference on Robotics and Automation (ACRA2013). Australasian Robotics and Automation Association, 2013. (Year: 2013).*

Ulas et al. ("A 3d scan matching method based on multi-layered normal distribution transform." IFAC Proceedings vols. 44.1 (2011): 11602-11607). (Year: 2011).*

Extended European Search Report mailed Nov. 17, 2021, issued in corresponding European Application No. EP 19885755.9, filed Nov. 15, 2019, 7 pages.

\* cited by examiner

STRONG LASER SCANNER MATCHING METHOD AND APPARATUS CONSIDERING MOVEMENT OF GROUND ROBOT

TECHNICAL FIELD

The inventive concept relates to a laser scanner matching technology, and more particular, to a method and a device that may improve a 3D data matching success rate of a laser scanner in consideration of movement characteristics of a ground robot, for example, an unmanned vehicle, a mobile robot, and the like.

BACKGROUND ART

Because of tremendous advances made by a light detection and ranging (LiDAR) sensor technology in recent decades, the LiDAR sensor is used in various robotic fields including simultaneous localization and mapping (SLAM), localization, map generation, object and pedestrian detection, and the like. A DARPA Grand/Urban Challenge has proved a possibility of fully autonomous driving using the LiDAR sensor. The LiDAR sensor may obtain information with a high accuracy from an environment, but may not be able to obtain all information because of limitation in a scan range. Therefore, data registration is required for the localization and the map generation.

A scan matching algorithm is widely used for registration of a 3D shape. In the early 1990s, an iterative closest point (ICP) technology was first proposed for scan matching. An ICP algorithm iteratively calculates transformations between two 3D shapes by searching for correspondence pairs at each step. A conventional technology of an embodiment proposed a "point-to-point" ICP algorithm that searches for the correspondence pairs from the geometrically nearest point in a 3D shape. A conventional technology of another embodiment introduced a "point-to-plane" ICP algorithm that may be used as range data by estimating a target model as a plane. A conventional technology of still another embodiment introduced a robust ICP algorithm that deals with generation and destruction of outliers and occlusion.

After the ICP algorithms were proposed, many alternative studies were conducted. A technology of one embodiment proposed an iterative dual correspondence (IDC) to improve robot pose estimation in unknown environments by matching 2D range scans. A metric-based ICP (MbICP) algorithm is designed to solve a large initial direction error by minimizing a geometric distance including a direction and a movement of a sensor at the same time. Unlike the ICP algorithm, a normal distributions transform (NDT) algorithm proposed a new approach to the laser scan matching that does not require explicit correspondences. This method optimizes transformations using a normal distribution of each cell generated from probabilities of measuring points. However, these conventional methods try to match a dense point cloud model, so that it is difficult to apply these conventional methods directly to a 3D LiDAR, which is equipped with most autonomous vehicles.

Data provided from a 3D LiDAR sensor, which is also known as a multi-layer LiDAR, is rare because of limitation of a sensor coverage region. Thus, other researchers focus on a research of matching with multi-layer LiDAR sensor data. In a technology of one embodiment, a generalized ICP (G-ICP) method and a multi-channel G-ICP use sparse data matching in consideration with a covariance of each point in rigid transformation. A technology of another embodiment proposed a cluster iterative closest point (CICP) for sparse-dense point cloud registration. A technology of still another embodiment introduced probabilistic data association for data registration. 3D and multi-layer NDT algorithm is also designed to match the 3D multi-layer sensor. A technology of still further another embodiment introduced 3D scan registration using ground segmentation and NDT, and also introduced a 3D point cloud alignment for a ground plane dominant environment. Such algorithm only considers characteristics of a sensor system or an environment and does not consider movements of the sensor system or the vehicle.

Most studies have reported an improved performance by analyzing data in various methods. However, these methods are not well suited for the autonomous vehicles because an original purpose of a data registration algorithm is to match two 3D shapes with each other for 3D reconstruction.

Thus, there is a need for a robust scan matching algorithm with ground vehicle constraint conditions.

DETAILED DESCRIPTION OF THE INVENTION

Technical Problem

Embodiments of the inventive concept provide a method and a device for improving a 3D data matching success rate of a laser scanner in consideration of movement characteristics of a ground robot, for example, an unmanned vehicle, a mobile robot, and the like.

Technical Solution

According to an exemplary embodiment, a scan matching method includes receiving two point clouds, sequentially inspecting height values until a point is within a specific height range to search for correspondence points between the two point clouds, and performing scan matching between the two point clouds based on the search result of the correspondence points.

According to an exemplary embodiment, the searching of the correspondence points may include dividing the height range of the point into a predetermined number of multi-layers, and searching for a correspondence point between the two point clouds at each layer based on a height range of each of the multi-layers.

According to an exemplary embodiment, the number of multi-layers may be determined by a preset value and a maximum height of the point cloud.

According to an exemplary embodiment, the searching of the correspondence points may include searching for points respectively nearest to a relevant layer, an upper layer, and a lower layer of each point, and selecting the nearest point among the searched three points as the correspondences point.

According to an exemplary embodiment, the receiving of the two point clouds may include further receiving initial transformation information, and the searching of the correspondence points may include reflecting the initial transformation information to search for the correspondence points.

According to an exemplary embodiment, a scan matching method includes receiving two point clouds, searching for correspondence points between the two point clouds in consideration of movement characteristics of a ground robot, and performing scan matching between the two point clouds based on the search result of the correspondence points.

According to an exemplary embodiment, the searching of the correspondence points may include sequentially inspecting height values until a point is within a specific height range to search for the correspondence points between the two point clouds.

According to an exemplary embodiment, the searching of the correspondence points may include dividing the height range of the point into a predetermined number of multi-layers, and searching for a correspondence point between the two point clouds at each layer based on a height range of each of the multi-layers.

According to an exemplary embodiment, the searching of the correspondence points may include searching for points respectively nearest to a relevant layer, an upper layer, and a lower layer of each point, and selecting the nearest point among the searched three points as the correspondences point.

According to an exemplary embodiment, a scan matching device includes a receiver that receives two point clouds, a searching device that sequentially inspects height values until a point is within a specific height range to search for correspondence points between the two point clouds, and a matching device that performs scan matching between the two point clouds based on the search result of the correspondence points.

According to an exemplary embodiment, the searching device may divide the height range of the point into a predetermined number of multi-layers, and search for a correspondence point between the two point clouds at each layer based on a height range of each of the multi-layers.

According to an exemplary embodiment, the number of multi-layers may be determined by a preset value and a maximum height of the point cloud.

According to an exemplary embodiment, the searching device may search for points respectively nearest to a relevant layer, an upper layer, and a lower layer of each point, and select the nearest point among the searched three points as the correspondences point.

According to an exemplary embodiment, the receiver may further receive initial transformation information, and the searching device may reflect the initial transformation information to search for the correspondence points.

Advantageous Effects of the Invention

According to the embodiments of the inventive concept, the 3D data matching success rate of the laser scanner may be improved in consideration of the movement characteristics of the ground robot, for example, the unmanned vehicle, the mobile robot, and the like.

The inventive concept may be applied to the ground robot such as the unmanned vehicle, the mobile robot, and the like, and thus, may be used in technologies such as 3D map generation, location recognition, a navigation, and the like.

Such inventive concept is a robust complement to the existing ICP algorithm for easy use in the ground robot such as the unmanned vehicle, the mobile robot, and the like, which may be used as an element technology of the unmanned vehicle, a service robot, and the like that are already marketable, so that the inventive concept has great expected effects.

BEST MODE

The features and advantages of the inventive concept, and a method for achieving those will become apparent from the following description of the following embodiments given in conjunction with the accompanying drawings. However, the inventive concept is not limited to the embodiments disclosed below, but may be implemented in various forms. The embodiments of the inventive concept are only provided to make the disclosure of the inventive concept complete and fully inform those skilled in the art to which the inventive concept pertains of the scope of the inventive concept. The inventive concept is only defined by scopes of claim.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other components, steps, operations, and/or elements, in addition to the aforementioned components, steps, operations, and/or elements.

Unless otherwise defined, all terms used herein, including technical or scientific terms, have the same meanings as those generally understood by those skilled in the art to which the inventive concept pertains. Such terms as those defined in a generally used dictionary are not to be interpreted as having ideal or excessively formal meanings unless clearly defined as having such in the inventive concept.

Hereinafter, embodiments of the inventive concept will be described in detail with reference to the accompanying drawings. The same reference numerals denote the same components in the drawings, and redundant descriptions for the same components will be omitted.

With a vast development in a field of an autonomous vehicle, use of point cloud data is increasing. A simultaneous localization and mapping (SLAM) algorithm is generally used to generate a sophisticated point cloud map. In the SLAM algorithm, a quality of the map depends on a performance of a loop closure algorithm. An iterative closest point (ICP) algorithm is widely used for loop closure of a point cloud, but may not be suited well for a ground vehicle because the ICP algorithm was originally developed for 3D reconstruction in a field of computer vision.

Embodiments of the inventive concept are to search for robust matching correspondences of the ICP algorithm for ground vehicle conditions, and an object thereof is to improve a 3D data matching success rate of a laser scanner in consideration of movement characteristics of a ground robot, such as an unmanned vehicle, a mobile robot, and the like.

An algorithm provided by the inventive concept is a method for matching a 3D point cloud, and the inventive concept provides an algorithm robust for point cloud matching measured by the ground robot using a condition of the ground robot rather than simply analyzing and matching the point cloud.

A conventional algorithm performs the matching considering only characteristics of the point cloud data, but the inventive concept performs the matching considering an environment in which the data is collected, so that the inventive concept may provide better results than the conventional algorithm when being applied to the ground robot.

A detailed description of such inventive concept is as follows.

The ground vehicle may only move on a ground plane that exists along a horizontal direction. The ground robot, including the ground vehicle, has a 6 degree-of-freedom (DoF) movement, but a relative transformation of 3D LiDAR data is mainly related to a ground plane direction, resulting in less movements in z, roll, and pitch compared to large changes in x, y, and yaw.

The inventive concept is to introduce an efficient search method that searches for the best correspondence for the ground vehicle application. A general search algorithm in ICP iteration relies on a geometric distance without any limitation. Thus, the inventive concept provides a ground plane search algorithm. Because the ground plane usually exists in a x-y plane, the inventive concept searches for the correspondences through boundary search based on height information z. Unlike a 2D ICP algorithm, a 6 degree-of-freedom transformation may be estimated at each iteration step to solve a ground slope condition.

Ground Plane ICP
G-ICP (generalized ICP)

A main concept of a standard ICP algorithm consists of two steps. First, matched correspondences are calculated using geometric distances from two scan data. Second, the transformation between the two scan data is calculated by minimizing the distances of the matched correspondences. These two steps are iterated until the two steps converge to obtain a last transformation. Some researchers focus on the first step by calculating correspondences better than a standard. Other researchers aim for the second step about data processing during the calculation of the transformations. The inventive concept focuses on the first step to improve a matching quality for the ground conditions.

Input: A = {$a_i$}: target point cloud
B = {$b_i$}: query point cloud
$T_0$: initial transformation
Output: T: the aligned transformation with A and B
1    T ← $T_0$
2    $K^A$ ← k-dTreeGeneration(A)
3    while not converged do
4       for    i → 1 to N do
5               $m_i$ ← SearchClosestPoint($K^A$, T · $b_i$)
6       end 7    $T \leftarrow \underset{T}{\operatorname{argmin}} \sum_i \|T \cdot b_i - m_i\|^2$ 8    end An algorithm 1 represents a standard "point-to-point" ICP, and inputs are two point clouds A and B and an initial transformation To, and an output is a final transformation T between the two point clouds. In the first step of the ICP algorithm, each matched correspondence $m_i$ is calculated by searching for the closest pair based on a current transformation T (line 5), and a k-d tree search algorithm previously generated in a line 2 is used. In the second step, the current transformation is calculated by minimizing the distance between matched correspondences (line 7). For robustness, outliers may be rejected by identifying a distance between the $m_i$ and $T*b_i$. A point-to-plane ICP may be implemented by simply changing the line 7 of the algorithm 1 as shown in Equation 1 below.

$$T \leftarrow \underset{T}{\operatorname{argmin}} \sum_i \|\eta_i \cdot (T \cdot b_i - m_i)\|^2 \qquad \text{[Equation 1]}$$

In this connection, $n_i$ may mean a surface normal vector of the $m_i$.

The inventive concept focuses on scan matching used in the ground vehicle. The G-ICP often yields acceptable results that match the multi-layer LiDAR sensor data, but does not take into account the ground conditions. The G-ICP uses sparse data in consideration of a tendency of the data during an optimization process. In a G-ICP algorithm, an optimization step is changed to a probability-based model in the line 7 of the algorithm 1.

When sets of matched correspondence points of the two scan data are represented as A={$a_i$}$_{i=i=1, \ldots, N}$ and B={$b_i$}$_{i=1, \ldots, N}$, probabilistic models of the point sets may be represented as $\hat{A}$={$\hat{a}_i$} and $\hat{B}$={$\hat{b}_i$}. In this connection, in $a_i \sim N(\hat{a}_i, C_i^A)$ and $b_i \sim N(\hat{b}_i, C_i^B)$, the $\hat{a}_i$ and the $\hat{b}_i$ may mean means, and the $C_i^A$ and the $C_i^B$ may mean covariance matrices calculated using a distribution of peripheral points. When T* is an aligned transformation, a relationship between the $\hat{a}_i$ and the $\hat{b}_i$ may be represented as in <Equation 2>below.

$$\hat{b}_i = T^* \hat{a}_i \qquad \text{[Equation 2]}$$

When a distance error of a random rigid transformation is defined as $d_i^{(T)} = b_i - Ta_i$, $d_i^{(T)}$ may be derived as shown in <Equation 3>.

$$d_i^{T} \sim N(\hat{b}_i - T^*\hat{a}_i, C_i^B + (T^*)C_i^A(T^*)^T) = N(0, C_i^B + (T^*)C_i^A (T^*)^T) \qquad \text{[Equation 3]}$$

Equation 3 above is obtained by applying $\hat{b}_i - T^* \hat{a}_i = 0$ in Equation 2, a simple optimization method may be performed as shown in <Equation 4>below to calculate the T*.

$$T^* = \underset{T}{\operatorname{argmin}} \sum_i d_i^{(T)^T} \left( C_i^B + TC_i^A T^T \right)^{-1} d_i^{(T)} \qquad \text{[Equation 4]}$$

A method according to an embodiment of the inventive concept also calculates the transformation of the correspondence pair using the G-ICP method.

GP-ICP (Ground Plane ICP)

The inventive concept provides an efficient search method for searching for the best correspondences for the ground vehicle. The method according to an embodiment of the inventive concept changes the search step based on the line 5 of the algorithm 1. A conventional method searches for the correspondences based on the closest points in a 2D or 3D geometric distance. Most of egomotions of the ground vehicle show the small change in the roll, pitch, and height direction z. In the conventional method, mismatch may occur because the correspondence points are found based on Euclidean distances in x, y, and z-axis directions without considering the ground conditions. In the ground vehicle, some conditions such as a large displacement in the z axis never occur. Thus, the inventive concept may provide a search algorithm with a height constraint condition by changing the line 5 of the algorithm 1 as shown <Equation 5>below.

$$m_i = \text{SearchClosestPoint}(K^A, T \cdot b_i) \| (m_i)_z - (T \cdot b_i)_z \| \leq \varepsilon, \quad \text{[Equation 5]}$$

In this connection, ε may mean a predetermined small value, and a subscript z may mean a predetermined height value of a vector.

When searching for the correspondences as in Equation 5 above, a mismatch pair is minimized by a z-axis condition.

FIG. 1 is an exemplary diagram of a matching method according to the inventive concept and a conventional matching method. FIG. 1 compares a matching method according to the inventive concept and a conventional matching method between a query point cloud (green) and a target point cloud (grey), and a yellow line indicates a result of the matching correspondence.

Figure 1A:
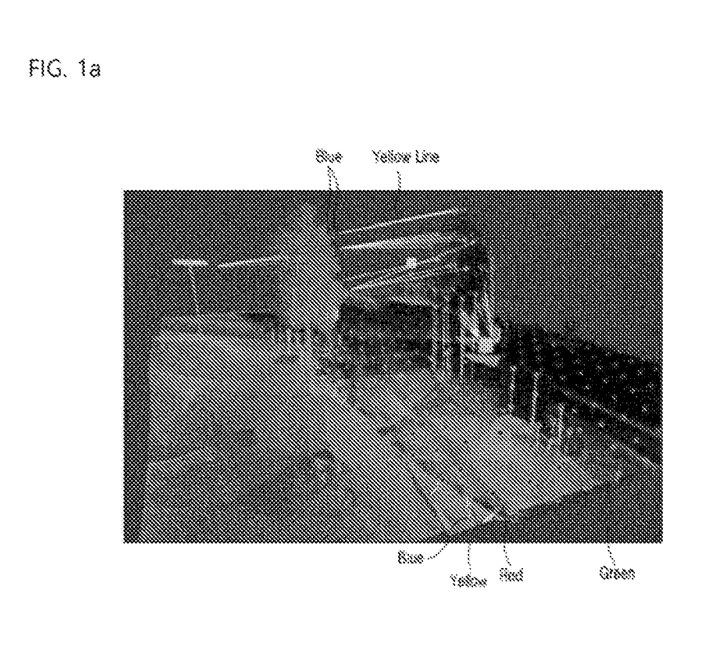
FIG. 1 is an exemplary diagram of a matching method according to the inventive concept and a conventional matching method.
Figure 1B:
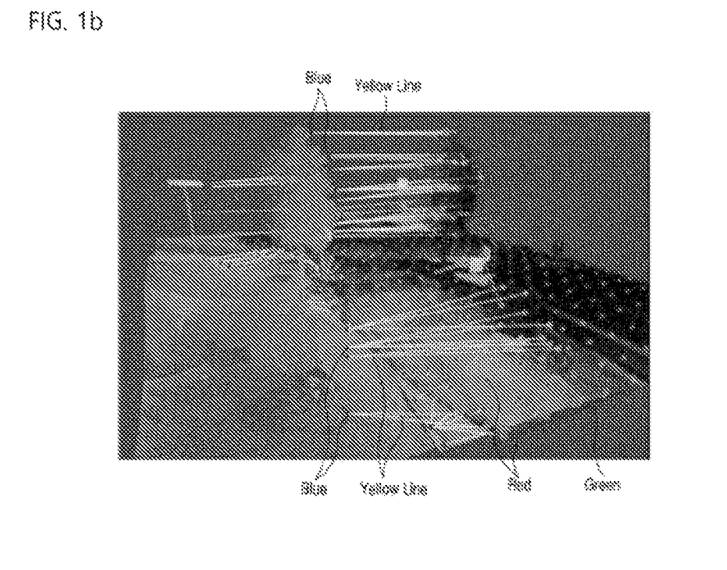
Figure 1C:
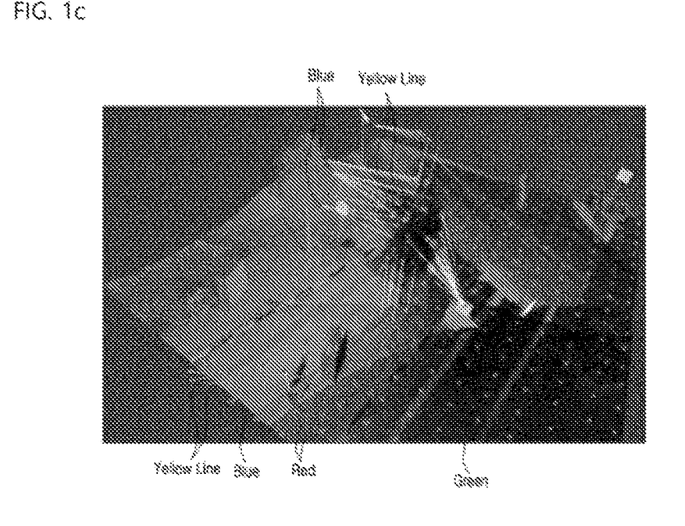
Figure 1D:
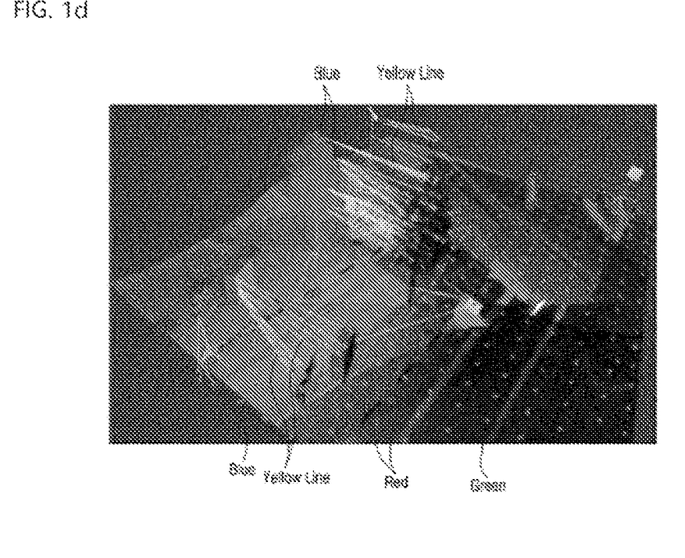

In this connection, FIG. 1A shows a matching result for the conventional method at a time point #1, FIG. 1B shows a matching result for the method of the inventive concept at the time point #1, FIG. 1C shows a matching result for the conventional method at a time point #2, and FIG. 1D shows a matching result for the inventive concept at the time point #2.

As may be seen from FIG. 1, it may be seen that the method according to an embodiment of the inventive concept has an advantage of matching vertical information better than the conventional matching method because a matching condition is limited to a specific height range. In addition, the method according to an embodiment of the inventive concept may estimate the 6-DoF transformation because of the limited height range, so that the method according to an embodiment of the inventive concept may solve the slope condition unlike the 2D ICP.

Acceleration of GP-ICP

An acceleration method of a GP-ICP algorithm will be described. The conventional ICP algorithm searches for the correspondence points by referring to the nearest neighboring points using the k-d tree algorithm. On the other hand, the inventive concept searches for the correspondence points by sequentially inspecting height values until the point is within a certain height range. In this case, complexity increases when many neighboring points are out of the height range. An average complexity of the conventional k-d tree search algorithm is O(log(n)). In this connection, n may mean the number of points in a search space. On the other hand, an average complexity of the inventive concept is O(p·log(n)). In this connection, p may mean the number of search attempts until the neighboring points are within the height range. Usually, 80 to 90% of the nearest points satisfy the height range, and other points do not satisfy the height range. In this connection, the p may be 1 when the height range is met, and the p may be very large when the height range is not met. Based on this, an acceleration method for searching for Equation 5 above using a multi-layer scheme may be provided.

Figure 2:
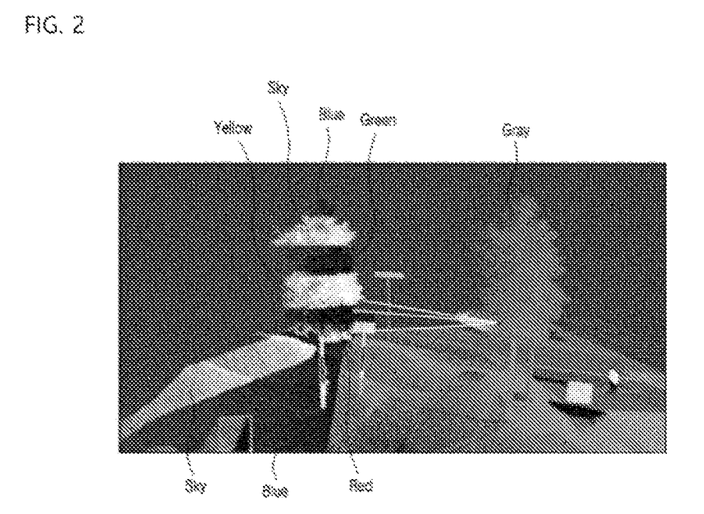
FIG. 2 is an exemplary diagram of a concept of acceleration of searching for matching correspondences using a multi-layer scheme.

FIG. 2 is an exemplary diagram of a concept of acceleration of searching for matching correspondences using a multi-layer scheme. As shown in FIG. 2, the target point cloud is divided evenly in a vertical direction by the ε of Equation 5 above, which is a predetermined small value in a multi-layer point cloud, which is a colored layer. The query point cloud searches for the nearest point at each layer based on the height value, and the correspondences are found from the nearest point in the height range among the searched points. A white line in FIG. 2 shows a result of matching correspondence with each multi-layer point cloud.

The k-d tree search algorithm is performed three times for a relevant layer, an upper layer, and a lower layer, so that an average complexity of the search algorithm in the inventive concept is O(3·log(n/L)). In this connection, L means a total number of layers, and the L may be determined by the ε and a maximum height of the point cloud. Such height limit search algorithm is performed only when a height condition is not satisfied (p≠1). A calculation time of a non-accelerated search algorithm depends on a p value, but an accelerated search algorithm has a constant calculation time. An accelerated method is faster than an unaccelerated method when the p value is greater than 3 even in the worst case of L=1. Because the p is often very large even when the height condition is not satisfied, the accelerated method may be much faster than the non-accelerated method.

An algorithm 2 is for an accelerated GP-ICP algorithm. A multi-layer k-d tree $K_{1,\ldots,h}^A$ is generated by a specific height spacing ε (line 3). In this connection, h may mean the number of layers. Line 7 inspects the height condition. In a line 8 of the algorithm 2, a relevant layer l of each point is selected by a z value of $T \cdot b_i$ at every iteration step. Each point nearest to each of the relevant layer (line 9), the upper layer thereof (line 10), and the lower layer thereof (line 11) is found by k-d tree search of a corresponding layer. A finally matched point is selected using the nearest point among three points ($m_i^+, m_i^0$, and $m_i^-$) under a height condition $|(m_i^*)_z - (T \cdot b_i)_z| \varepsilon$.

```
Input:   A = {a_i}: target point cloud
         B = {b_i}: query point cloud
         T_0: initial transformation
Output:  T: the aligned transformation with A and B
  1      T ← T_0
  2      K^A ← k-dTreeGeneration(A)
  3      K_{1,...,h}^A ← k-dTreeGeneration(A_{1,...,n})
  4      while not converged do
  5          for   i → 1 to N do
  6              m_i ← SearchClosestPoint(K^A, T · b_i)
  7              if |(m_i)_z − (T · b_i)_z| > ε then
  8                  l ← SearchLayerByZ(T · b_i)
  9                  m_i^+ ← SearchClosestPoint(K_{i+1}^A, T · b_i)
 10                  m_i^0 ← SearchClosestPoint(K_i^A, T · b_i)
 11                  m_i^− ← SearchClosestPoint(K_{i−1}^A, T · b_i)
 12                  m_i ← Mindistance (T · b_i, {m_i^+, m_i^0, m_i^−})||(m_i^*)_z −
(T · b_i)_z| ≤ ε
 13              end
 14          end
```

$$15 \quad T \leftarrow \underset{T}{\operatorname{argmin}} \sum_i \| T \cdot b_i - m_i \|^2$$

```
 16      end
```

Experiment

Figure 3:
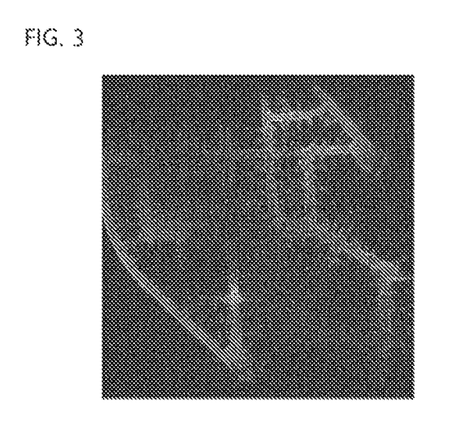
FIG. 3 is an exemplary diagram for point cloud data in a KITTI dataset.

Because the method of the inventive concept focuses on matching with the sparse data for the ground vehicle, the method of the inventive concept is validated using a KITTI dataset collected from a vehicle with a Velodyne 64E. The method of the inventive concept is tested using a benchmark dataset including actual measurement data, for example, the KITTI dataset as shown in FIG. 3. The GP-ICP is compared with the conventional methods such as the G-ICP, the point-to-point ICP, the point-to-plane ICP, and the NDT algorithm.

The experiment is performed by matching two point clouds collected at different locations with each other. 1,545 pairs are randomly selected by two point clouds having a distance difference of 7 to 10 m in the dataset of FIG. 3 to compare matching performances of the algorithms.

The method of the inventive concept has an advantage of robust matching under the ground conditions, each pair is tested to be matched at various initial transformations with x (−6 m to 6 m), y (−6 m to 6 m) and theta (−50° to 50°). In this connection, x-axis and y-axis directions indicate a front direction and a lateral direction of the vehicle, respectively.

FIG. 4 is an exemplary diagram of a success rate in each direction having various initial transformations, which shows a success rate in each direction with absolute initial transformation for each algorithm. In this connection, success or failure is determined using an error with the actual measurement data when the algorithm converges.

Figure 4A:
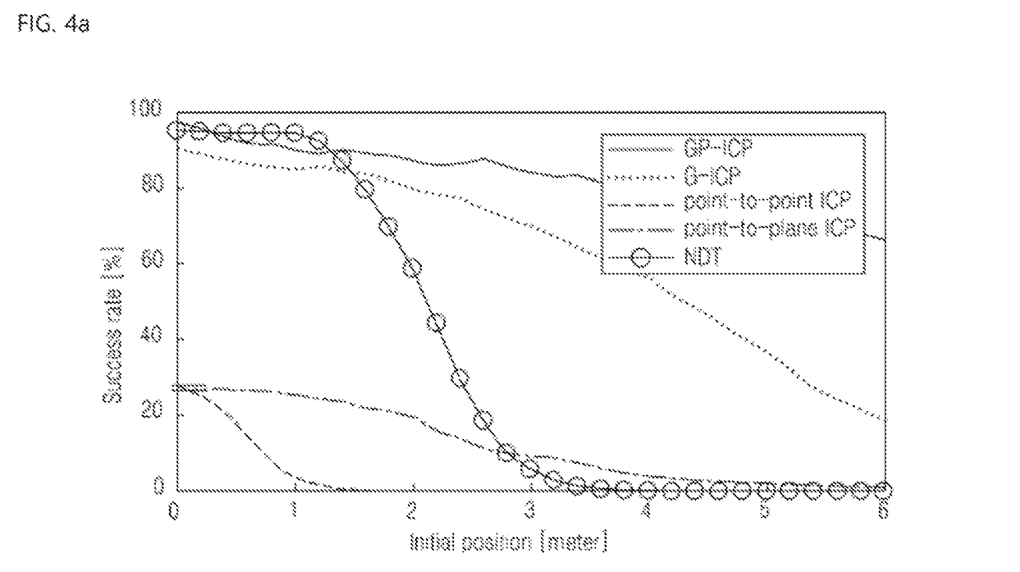
FIG. 4 is an exemplary diagram of a success rate in each direction having various initial transformations.
Figure 4B:
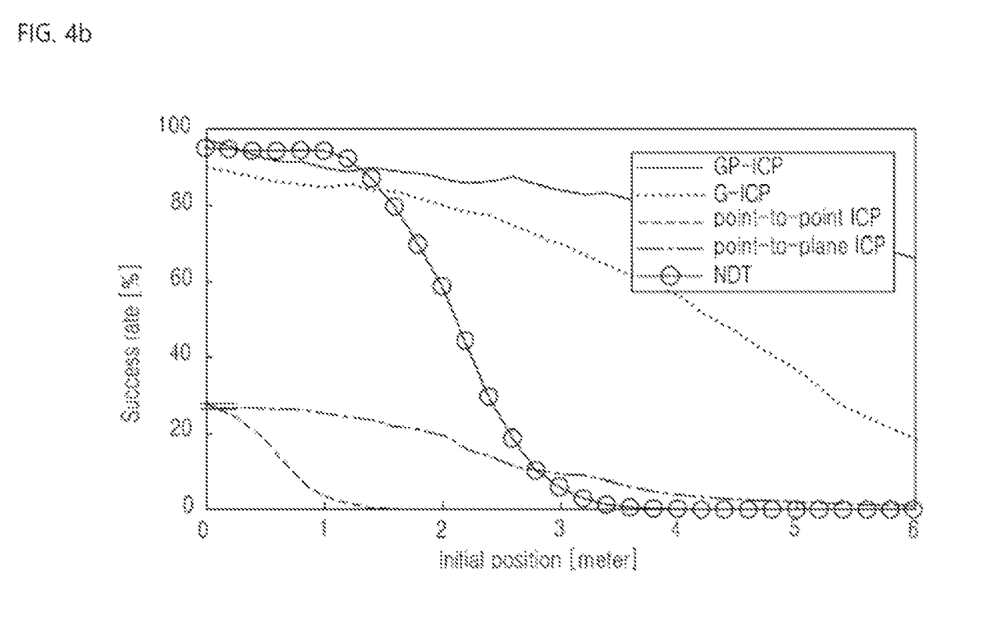
Figure 4C:
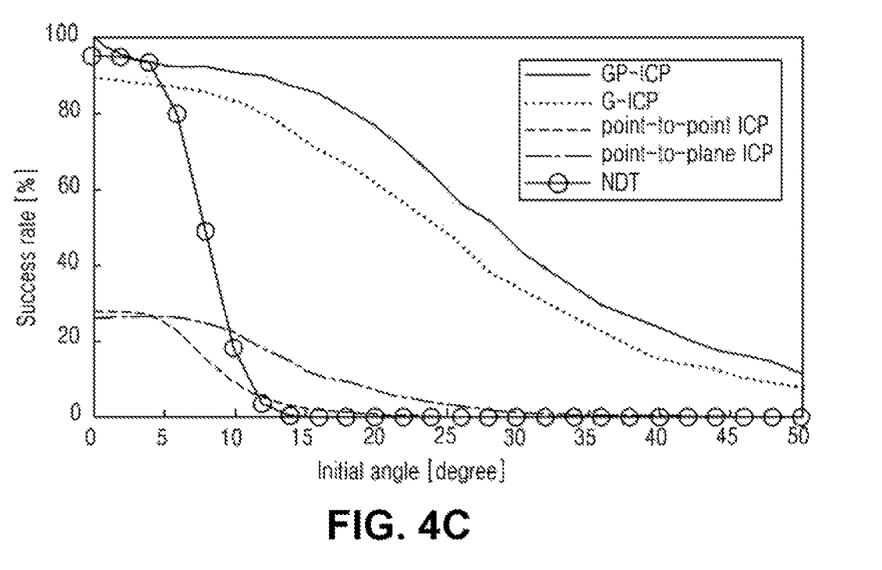

As shown in FIG. 4, it may be seen that the method of the inventive concept provides better results than the conventional methods in all the x-axis direction (a), the y-axis direction (b), and the yaw angle (c). In particular, it may be seen that the method of the inventive concept provides better results than other conventional methods in large initial transformation. Further, it may be seen that matching performances of the point-to-point ICP and the point-to-plane ICP are considerably degraded. In addition, it may be seen that the NDT algorithm shows an acceptable result only in small initial transformation, and it may be seen that a success rate of the G-ICP algorithm is slightly similar to that of the GP-ICP algorithm, but a performance thereof decreases rapidly as initial transformation in the x-axis direction increases. When considering the movement of the ground vehicle, matching for large initial transformation in the x-axis is more important than those in other axes. Thus, the method of the inventive concept is superior for the large initial transformation, especially for the large initial transformation for the x-axis.

TABLE 1

|  | x | y | z | roll | pitch | yaw |
|---|---|---|---|---|---|---|
| GP-ICP | 0.060 | 0.088 | 0.106 | 0.150 | 0.126 | 0.110 |
| G-ICP | 0.071 | 0.089 | 0.092 | 0.344 | 0.263 | 0.091 |
| Point-to-point ICP | 0.392 | 0.742 | 0.133 | 0.984 | 0.293 | 2.689 |
| Plane-to-plane ICP | 0.964 | 0.667 | 0.181 | 1.880 | 0.401 | 2.391 |
| NDP | 0.068 | 0.093 | 0.098 | 0.207 | 0.112 | 0.092 |

Table 1 is a table for a root mean square error (RMSE) of each algorithm compared with the actual measurement data, and the comparison result is generated from calculation using only pairs successfully matched in FIG. 4. As seen from Table 1, errors of the point-to-point ICP and the point-to-plane ICP are larger than those of other methods, and a result of NDT algorithm is slightly worse than those of the G-ICP and the GP-ICP. In addition, considering that GP-ICP uses the same optimization method as the G-ICP, it may be seen that errors of the G-ICP and the GP-ICP are similar to each other.

Average calculation times of successful matching based on the initial transformation are as shown in Table 2. Because the performances of the point-to-point ICP and the point-to-plane ICP are bad, a calculated time of the method according to the inventive concept is compared only with those of the G-ICP and the NDT. It may be seen that an average calculation time of the GP-ICP in the small initial transformation is slower than the average calculation time of the G-ICP, and the GP-ICP is faster in the large initial transformation. A search method of the GP-ICP is 1.33 times slower than that of the G-ICP. In this connection, n=100000, L=20, and $|(m^*_i)_z-(T \cdot b_i)_z|>\varepsilon$ is 15%. Nevertheless, it may be seen that an overall processing time of the GP-ICP is faster than an overall processing time of the G-ICP in initial transformation of x≥4 m, y≥2 m, or yaw≥20 deg, and this means that the GP-ICP converges rapidly in the large initial transformation. It may be seen that a calculation time of the NDT is usually low, and significantly increases in the large initial transformation.

TABLE 2

| (a) x-axis | | | | | | |
|---|---|---|---|---|---|---|
| x-axis (unit: meter) | [0, 1) | [1, 2) | [2, 3) | [3, 4) | [4, 5) | [5, 6) |
| GP-ICP | 2.286 | 2.876 | 3.340 | 3.803 | 4.217 | 4.553 |
| G-ICP | 2.075 | 2.634 | 3.197 | 3.755 | 4.332 | 5.302 |
| NDT | 2.584 | 5.562 | 7.488 | — | — | — |
| (b) y-axis | | | | | | |
| y-axis (unit: meter) | [0, 1) | [1, 2) | [2, 3) | [3, 4) | [4, 5) | [5, 6) |
| GP-ICP | 2.051 | 2.392 | 2.681 | 2.977 | 3.279 | 3.728 |
| G-ICP | 1.777 | 2.175 | 2.670 | 3.192 | 3.656 | 4.512 |
| NDT | 2.691 | 4.687 | 7.542 | — | — | — |
| (c) Yaw-axis | | | | | | |
| yaw-axis (unit: meter) | [0, 10) | [10, 20) | [20, 30) | [30, 40) | [40, 50) | |
| GP-ICP | 2.431 | 3.898 | 6.540 | 9.766 | 12.928 | |
| G-ICP | 1.788 | 3.807 | 6.964 | 10.479 | 14.259 | |
| NDT | 3.963 | 6.857 | — | — | — | |

FIGS. 5 to 8 are exemplary diagrams of point cloud matching results comparing a method of the inventive concept with a conventional method. In FIGS. 5 to 8, (a) represents the initial transformation, (b) represents the GP-ICP, (c) represents the G-ICP, (d) represents the point-to-point ICP, (e) represents the point-to-plane ICP, and (f) represents the NDT, a green dot represents the target point cloud, and a red dot represents a transformation result of the query point cloud.

Figure 5:
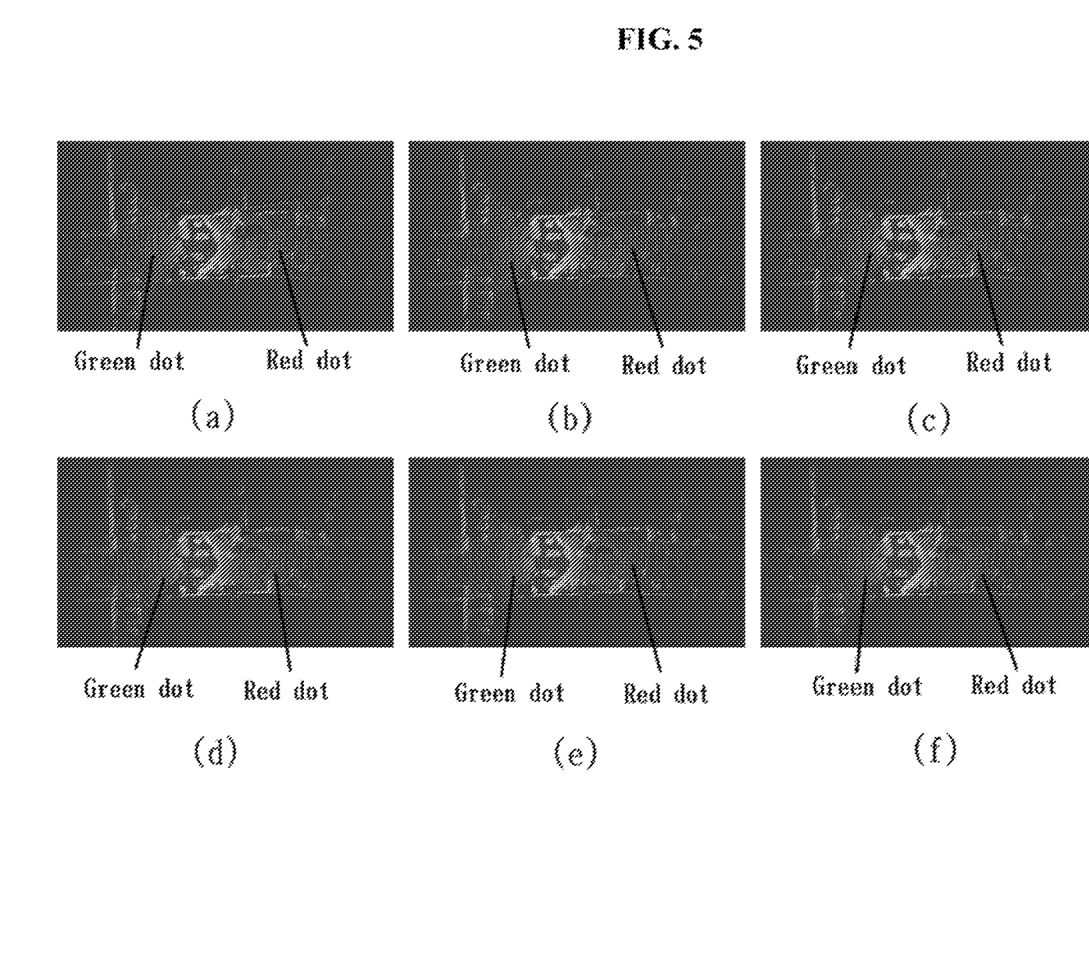
FIG. 5 is an exemplary diagram of point cloud matching results comparing a method of the inventive concept with a conventional method.
Figure 6:
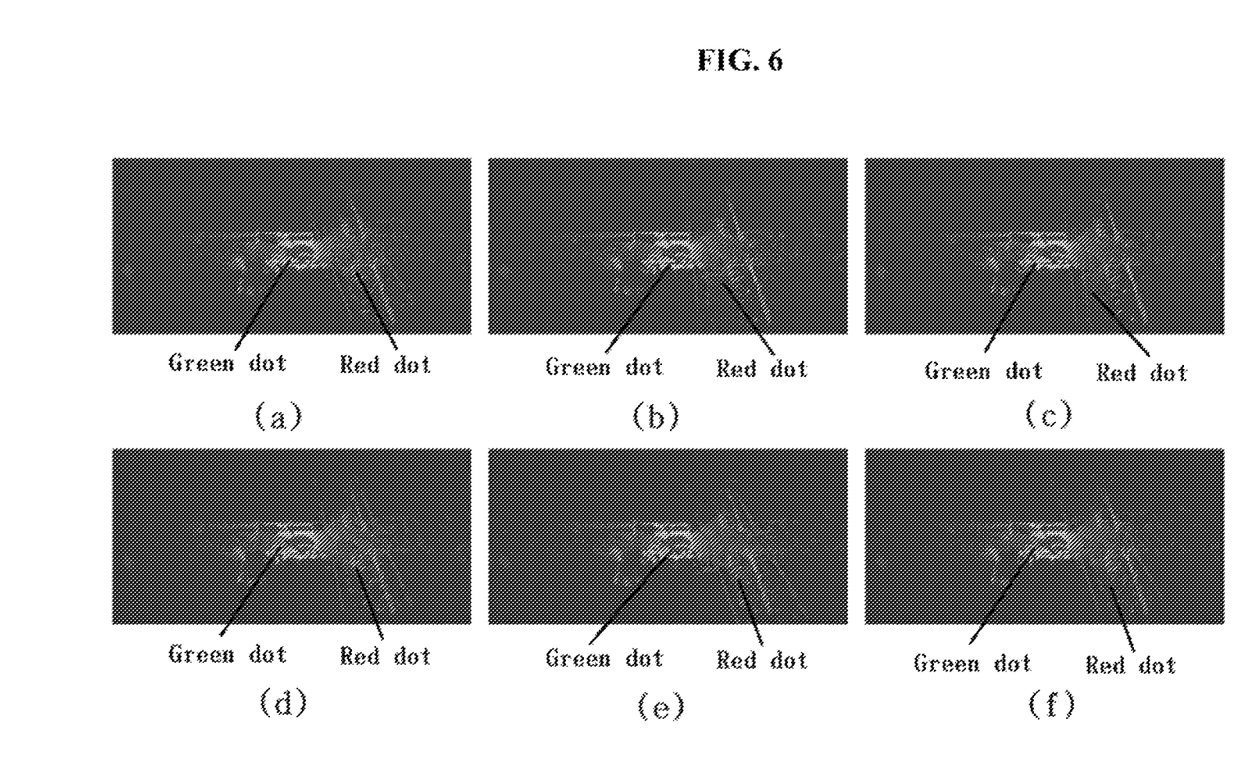
FIG. 6 is another exemplary diagram of point cloud matching results comparing a method of the inventive concept with a conventional method.
Figure 7:
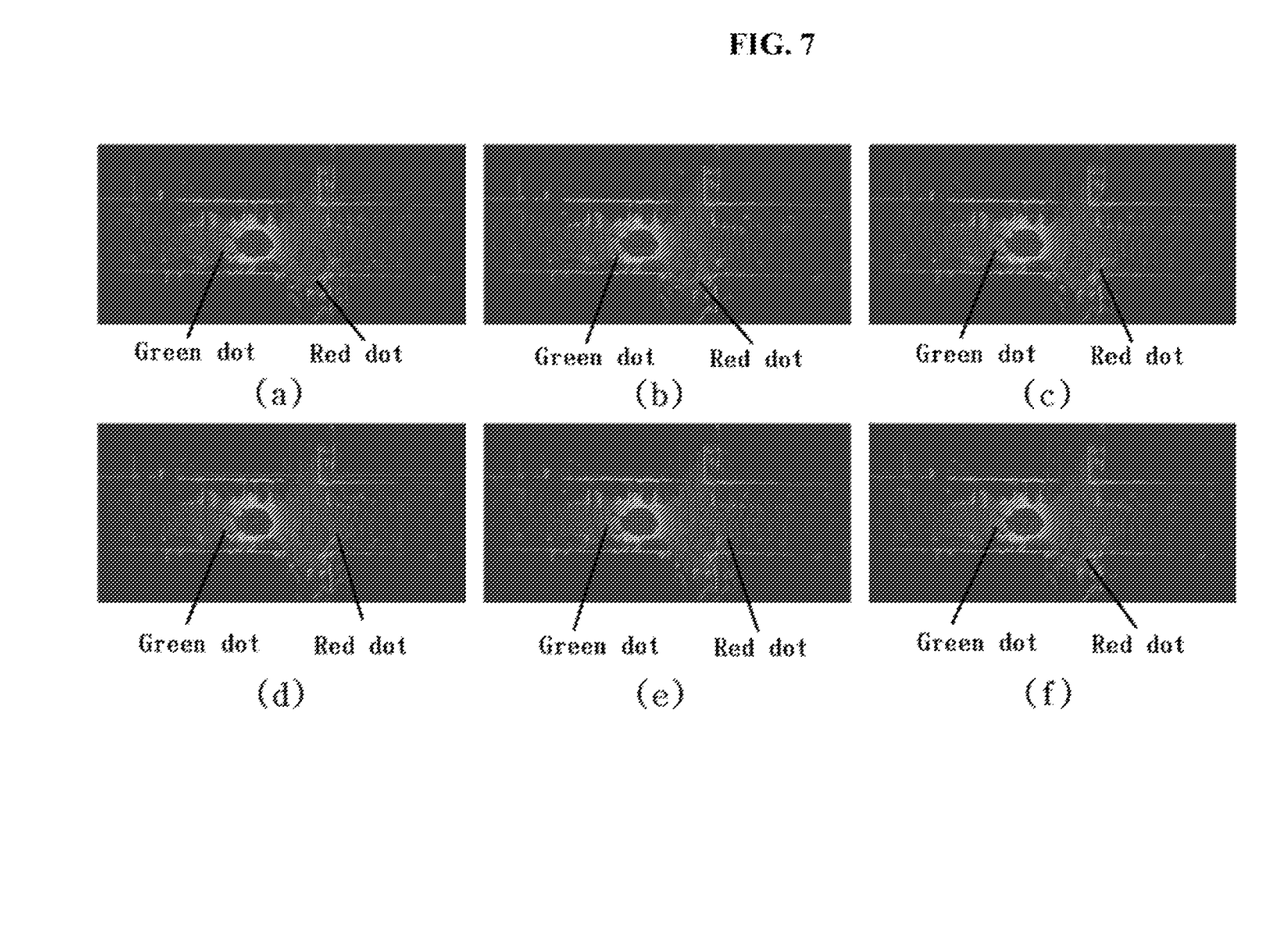
FIG. 7 is still another exemplary diagram of point cloud matching results comparing a method of the inventive concept with a conventional method.
Figure 8:
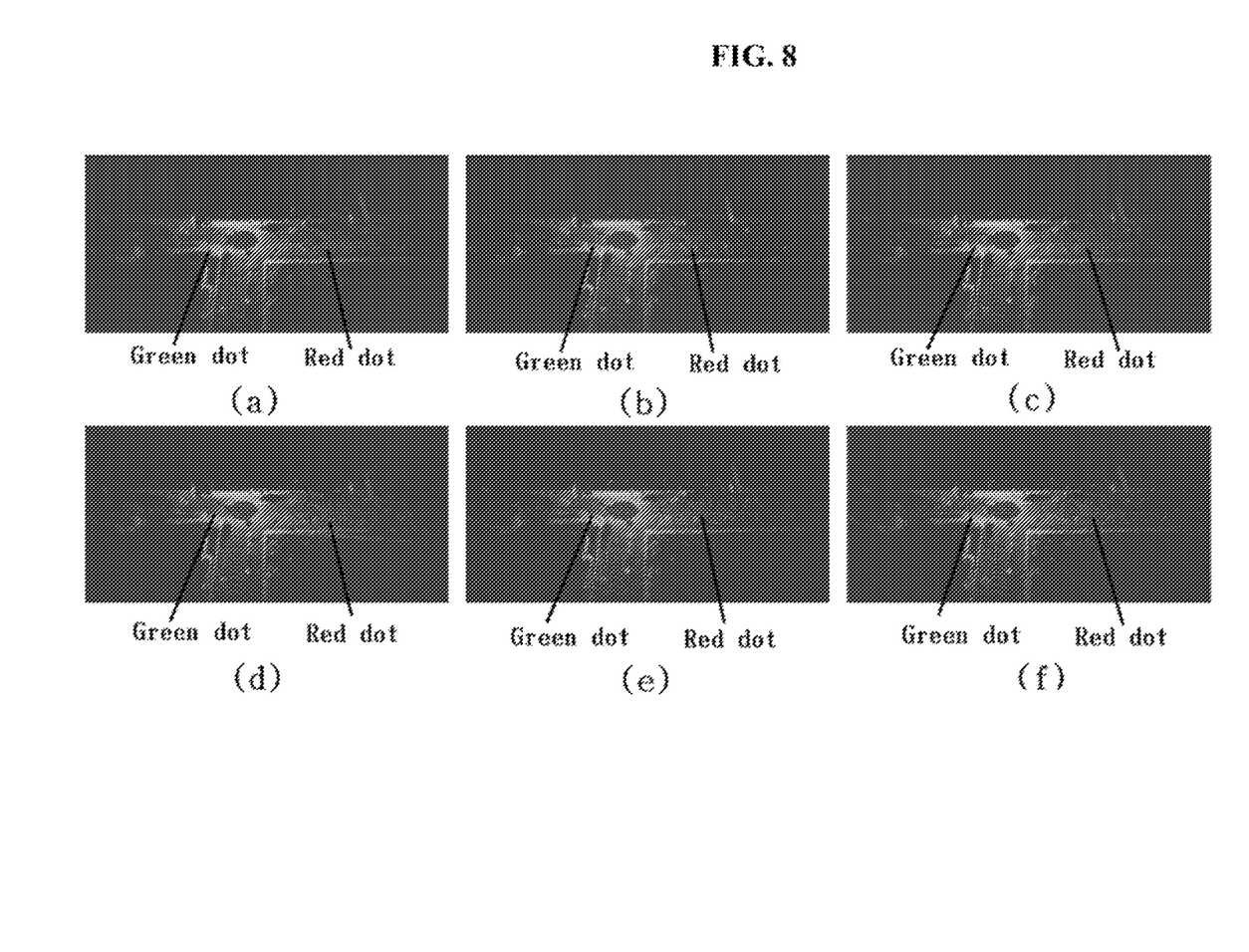
FIG. 8 is still further another exemplary diagram of point cloud matching results comparing a method of the inventive concept with a conventional method.

In this connection, FIG. 5 shows matching results for a case of x=1.2 m, y=0.4 m, and yaw=6 deg, FIG. 6 shows matching results for a case of x=3.0 m, y=0.6 m, and yaw=10 deg, FIG. 7 shows matching results for a case of x=3.5 m, y=0.5 m, and yaw=3 deg, and FIG. 8 shows matching results for a case of x=5.7 m, y=0.2 m, and yaw=1 deg.

As shown in FIG. 5, it may be seen that all algorithms match well in the small initial transformation. As shown in FIG. 6, it may be seen that the GP-ICP and the G-ICP continue to successfully match when the x-axis of the initial transformation increases, but the point-to-point ICP, the point-to-plane ICP, and the NDT do not perform a required performance. Further, as shown in FIGS. 7 and 8, it may be seen that the G-ICP does not perform good matching in the large initial transformation while the GP-ICP still performs successful matching.

As such, the method according to an embodiment of the inventive concept may improve the 3D data matching success rate of the laser scanner in consideration of the movement characteristics of the ground robot, for example, the unmanned vehicle, the mobile robot, and the like.

Such method according to the inventive concept may be embodied as a device. For example, a scan matching device according to the inventive concept includes a receiver that receives two point clouds, a searching device that sequentially inspects height values until a point is within a specific height range to search for correspondence points between the two point clouds, and a matching device that performs scan matching between the two point clouds based on the search result of the correspondence points.

In this connection, the searching device may divide the height range of the point into a predetermined number of multi-layers, and search for a correspondence point between the two point clouds at each layer based on a height range of each of the multi-layers. Further, the number of multi-layers may be determined by a preset value and a maximum height of the point cloud.

Further, the searching device may search for points respectively nearest to a relevant layer, an upper layer, and a lower layer of each point, and select the nearest point among the searched three points as the correspondences point.

The receiver may further receive initial transformation information, and the searching device may reflect the initial transformation information to search for the correspondence points.

Although a description thereof is omitted in a corresponding device, each component constituting the device may include all the contents described in FIGS. 1 to 8, which is obvious to those skilled in the art.

The foregoing devices may be realized by hardware elements, software elements and/or combinations thereof. For example, the devices and components illustrated in the exemplary embodiments of the inventive concept may be implemented in one or more general—use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be embodied in any type of machine, components, physical equipment, virtual equipment, computer storage media or units so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments or be known and available to those skilled in computer software. The computer-readable media include magnetic media such as hard disks, floppy disks, and magnetic tape; optical media such as CD-ROMs and DVDs; magneto-optical media such as floptical disks; and hardware devices that are specially configured to store and perform program instructions, such as ROM, RAM, flash memory, and the like. Program instructions include both machine codes, such as produced by a compiler, and higher level codes that may be executed by the computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

The invention claimed is:

1. A scan matching method comprising:
 receiving two point clouds generated by a 3D light detection and ranging (LiDAR) sensor of an autonomous ground vehicle or a mobile ground robot;
 sequentially inspecting height values until a point is within a specific height range to search for correspondence points between the two point clouds; and
 searching for the correspondence points, wherein the searching includes:
  dividing the height range into layers along a z-axis;
  searching for a correspondence point between the two point clouds in three of the layers based on the height range of each of the three layers, wherein the three layers include a relevant layer, an upper layer above the relevant layer along the z-axis, and a lower layer below the relevant layer along the z-axis;
  searching for nearest points respectively in the relevant layer, the upper layer, and the lower layer; and
  selecting the nearest point among the searched three points as the correspondence point; and
 performing scan matching between the two point clouds based on the search result of the correspondence points.

2. The scan matching method of claim 1, wherein the number of layers is determined by a preset value and a maximum height of the point cloud.

3. The scan matching method of claim 1, wherein the receiving of the two point clouds includes:
 further receiving initial transformation information, and
 wherein the searching of the correspondence points includes:
 reflecting the initial transformation information to search for the correspondence points.

4. A scan matching method comprising:
 receiving two point clouds generated by a 3D light detection and ranging (LiDAR) sensor of a mobile ground robot;

searching for correspondence points between the two point clouds in consideration of movement characteristics of the mobile ground robot, wherein the searching includes:
  dividing the height range into layers along a z-axis;
  searching for a correspondence point between the two point clouds in three of the layers based on the height range of each of the three layers, wherein the three layers include a relevant layer, an upper layer above the relevant layer along the z-axis, and a lower layer below the relevant layer along the z-axis;
  searching for nearest points respectively in the relevant layer, the upper layer, and the lower layer; and
  selecting the nearest point among the searched three points as the correspondence point; and
performing scan matching between the two point clouds based on the search result of the correspondence points.

5. The scan matching method of claim 4, wherein the searching of the correspondence points includes:
  sequentially inspecting height values until a point is within a specific height range to search for the correspondence points between the two point clouds.

6. A scan matching device comprising:
  a receiver configured to receive two point clouds generated by a 3D light detection and ranging (LiDAR) sensor of a mobile ground robot;
  a searching device configured to sequentially inspect height values until a point is within a specific height range and to search for correspondence points between the two point clouds, wherein the searching includes:
    dividing the height range into layers along a z-axis;
    searching for a correspondence point between the two point clouds in three of the layers based on the height range of each of the three layers, wherein the three layers include a relevant layer, an upper layer above the relevant layer along the z-axis, and a lower layer below the relevant layer along the z-axis;
    searching for nearest points respectively in the relevant layer, the upper layer, and the lower layer; and
    selecting the nearest point among the searched three points as the correspondence point; and
  a matching device configured to perform scan matching between the two point clouds based on the search result of the correspondence points.

7. The scan matching device of claim 6, wherein the number of layers is determined by a preset value and a maximum height of the point cloud.

8. The scan matching device of claim 6, wherein the receiver is configured to further receive initial transformation information, and
  wherein the searching device is further configured to reflect the initial transformation information to search for the correspondence points.

* * * * *